(12) United States Patent
Hartman et al.

(10) Patent No.: US 12,146,494 B2
(45) Date of Patent: *Nov. 19, 2024

(54) MULTI-STAGE COMPRESSOR HAVING INTERSTAGE LUBRICANT INJECTION VIA AN INJECTION ROD

(71) Applicant: Ingersoll-Rand Industrial U.S., Inc., Davidson, NC (US)

(72) Inventors: Ryan D. Hartman, Charlotte, NC (US); Daniel R. Crum, Huntersville, NC (US); Ryan Coleman, Huntersville, NC (US); Philipp Bothe, Castrop-Rauxel (DE)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,337

(22) Filed: Sep. 5, 2023

(65) Prior Publication Data

US 2024/0003347 A1   Jan. 4, 2024

Related U.S. Application Data

(63) Continuation of application No. 17/565,602, filed on Dec. 30, 2021, now Pat. No. 11,781,547, which is a
(Continued)

(51) Int. Cl.
*F04C 29/02* (2006.01)
*F04C 23/00* (2006.01)
(Continued)

(52) U.S. Cl.
CPC ......... *F04C 29/023* (2013.01); *F04C 23/003* (2013.01); *F04C 29/0007* (2013.01);
(Continued)

(58) Field of Classification Search
CPC ...... F04C 29/023; F04C 29/04; F04C 29/025; F04C 29/0007; F04C 23/003; F16N 7/34; F25B 1/10; F25B 31/002; F25B 31/047
See application file for complete search history.

(56) References Cited

U.S. PATENT DOCUMENTS 2,264,914 A   12/1941   Rudolf et al.
2,699,358 A    1/1955   Konrad et al.
(Continued)

FOREIGN PATENT DOCUMENTS

CN   201539411 U   8/2010
CN   201858157 U   6/2011
(Continued)

OTHER PUBLICATIONS

Examination Report for European Application No. 19160303.4, Apr. 30, 2021, 5 pages.
(Continued)

*Primary Examiner* — Michael R Mansen
*Assistant Examiner* — Mark K Buse
(74) *Attorney, Agent, or Firm* — Kevin E. West; Advent, LLP

(57) ABSTRACT

A compressor is disclosed which can include a first stage and a second stage. In one form the compressor includes contact cooled compressor stages. The compressor can include a rod useful to inject a lubricant for purposes of cooling/lubricating/sealing the rotating components of the compressor. In one form the rod is an elongate rod with openings which permit a lubricant such as oil to be injected. The injected oil can be atomized via the openings. The rod can be positioned in the interstage space between the first and second stages, and can include a variety of openings.

20 Claims, 7 Drawing Sheets

Related U.S. Application Data continuation of application No. 15/909,569, filed on Mar. 1, 2018, now Pat. No. 11,215,182.

(51) Int. Cl.
*F04C 29/00* (2006.01)
*F16N 7/34* (2006.01)
*F25B 1/047* (2006.01)
*F25B 1/10* (2006.01)
*F25B 31/00* (2006.01)

(52) U.S. Cl.
CPC ............... *F16N 7/34* (2013.01); *F25B 1/047* (2013.01); *F25B 1/10* (2013.01); *F25B 31/002* (2013.01); *F04C 29/02* (2013.01)

(56) References Cited

U.S. PATENT DOCUMENTS

| | | |
|---|---|---|
| 3,795,117 A | 3/1974 | Moody, Jr. et al. |
| 3,820,923 A | 6/1974 | Zweifel et al. |
| RE30,499 E * | 2/1981 | Moody, Jr. .......... F04C 29/0014 62/505 |
| 4,311,021 A * | 1/1982 | Leo .................. F25B 1/047 62/468 |
| 4,375,156 A | 3/1983 | Shaw |
| 4,497,185 A | 2/1985 | Shaw |
| 5,299,657 A * | 4/1994 | Hikes ................... F16N 39/06 184/104.1 |
| 5,341,900 A * | 8/1994 | Hikes ................... F16H 57/04 184/104.1 |
| 5,509,273 A | 4/1996 | Lakowske et al. |
| 5,653,585 A * | 8/1997 | Fresco .................. F25B 1/047 418/94 |
| 7,647,790 B2 | 1/2010 | Ignatiev et al. |
| 11,215,182 B2 * | 1/2022 | Hartman .............. F25B 1/047 |
| 11,781,547 B2 * | 10/2023 | Hartman ................ F16N 7/34 184/6.12 |
| 2003/0223897 A1 * | 12/2003 | Ferentinos ............. F04C 18/16 418/83 |
| 2009/0025680 A1 | 1/2009 | Kihara et al. |
| 2010/0155509 A1 * | 6/2010 | Keim ..................... B21K 29/00 239/556 |
| 2012/0051958 A1 | 3/2012 | Santos et al. |
| 2013/0209299 A1 | 8/2013 | Santos et al. |
| 2016/0223196 A1 | 8/2016 | Tuttle |
| 2018/0119601 A1 * | 5/2018 | Lin ........................ F04C 18/16 |
| 2019/0093659 A1 * | 3/2019 | Crum ....................... F16N 7/34 |
| 2022/0120278 A1 * | 4/2022 | Hartman ................... F25B 1/10 |
| 2022/0372982 A1 * | 11/2022 | Yorikane ................ F04C 18/16 |
| 2022/0390157 A1 * | 12/2022 | Tanaka .................... F25B 41/40 |

FOREIGN PATENT DOCUMENTS

| | | |
|---|---|---|
| CN | 104214034 A | 12/2014 |
| CN | 104454461 A | 3/2015 |
| CN | 204212987 U | 3/2015 |
| CN | 105715548 A | 6/2016 |
| CN | 205714782 U | 11/2016 |
| CN | 106593867 A | 4/2017 |
| CN | 206492330 U | 9/2017 |
| DE | 202016006678 U1 | 1/2017 |
| DE | 202016006745 U1 | 1/2017 |
| EP | 3315779 A1 | 5/2018 |
| GB | 2094891 * | 9/1982 |
| GB | 2094891 A | 9/1982 |
| WO | 9518945 A1 | 7/1995 |

OTHER PUBLICATIONS

Extended European Search Report, European Patent Application No. 19160303.4, Aug. 1, 2019, 8 pages.
Office Action for Chinese Application No. 201910156630.0, dated Feb. 23, 2022.
Office Action for Chinese Application No. 201910156630.0, dated Nov. 18, 2022.
Office Action in China for Application No. 201910156630.0, dated Feb. 23, 2023.
Office Action in Europe for Application No. 19160303.4, dated Apr. 4, 2023.
Second Office Action in China for Application No. 201910156630.0, dated Aug. 1, 2022.

* cited by examiner

MULTI-STAGE COMPRESSOR HAVING INTERSTAGE LUBRICANT INJECTION VIA AN INJECTION ROD

TECHNICAL FIELD

The present application generally relates to industrial air compressor systems and more particularly, but not exclusively, to a compressor system having lubricant/coolant injection.

BACKGROUND

Screw compressor systems are configured to produce a pressurized fluid such as compressed air or the like. Some screw compressors include oil flooded contact cooling lubricant systems. The cooling and lubricating effectiveness of the oil injection systems for oil flooded compressors is vital to the operation of the compressor. Some existing systems have various shortcomings relative to certain applications. Accordingly, there remains a need for further contributions in this area of technology.

SUMMARY

One embodiment of the present invention is a unique compressor system with an injection nozzle configured to deliver lubricant/coolant to a flow of compressed working fluid. Other embodiments include apparatuses, systems, devices, hardware, methods, and combinations for injecting lubricant/coolant into a compression chamber of a screw compressor. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
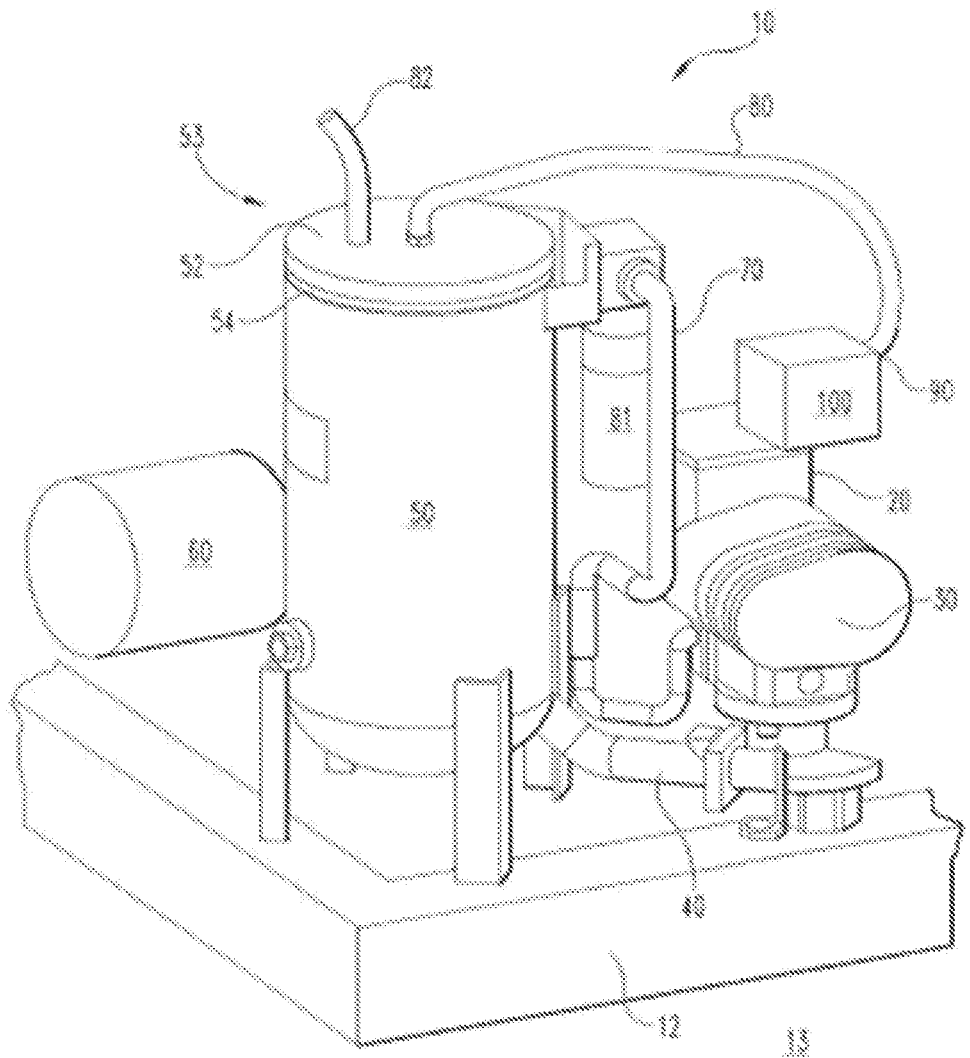
FIG. 1 depicts one embodiment of a compressor.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial compressor systems are configured to provide large quantities of compressed fluids at a desired temperature, pressure and mass flow rate. Some compressor systems can utilize a lubricant/coolant in the process of compressing a working fluid. Such lubricant/coolant can take a variety of forms, such as but not limited to oil. The term "working fluid" should be understood to include any suitable compressible fluid such as but not limited to air. It should be understood that when the term "air" is used in the specification or claims that other working fluids are included under a broad definition of compressible fluids. Also, when the term "oil" or "lubricant" or "lubricant/coolant" is used in the instant application, it should be understood that any lubrication fluid whether carbon based, synthetic, or natural is contemplated herein.

Compressor systems such as those including screw compressors can be lubricated, sealed and cooled with lubricant that is injected into a compression chamber having meshed male and female screw rotors. Contact cooled rotary screw compressors can include injection of lubricant into the compression chambers to lubricate the contacting rotor surfaces, seal the clearance regions between the rotors, and cool the working fluid as it is compressed.

Referring now to FIG. 1, an exemplary compressor system 10 is shown therein. The compressor system 10 includes a primary motive source 20 such as an electric motor, an internal combustion engine or a fluid-driven turbine and the like. The compressor system 10 can include a compressor 30 that may include multi-stage compression. The compressor 30 can include screw rotors operable to compress a working fluid such as air and oil vapor or the like.

A structural base 12 is configured to support at least portions of the compressor system 10 on a support surface 13 such as a floor or ground. Portions of the compressed working fluid discharged from the compressor 30 can be transported through one or more conduits 40 to a sump or separator tank 50 for separating fluid constituents such as air and oil or the like. One or more coolers 60 can be operably coupled with the system 10 for cooling working fluids to a desired temperature in some embodiments. The one or more coolers 60 can cool working fluids such as compressed air or oil to a desired temperature. The compressor system 10 can also include a controller 100 operable for controlling the primary motive power source 20 and various valving and fluid control mechanisms (not shown) between the compressor 30 and intercoolers 60 such as a blow down valve 90.

The separator tank 50 can include a lid 52 positioned proximate a top portion 53 thereof. A seal 54 can be positioned between the lid 52 and separator tank 50 so as to provide a fluid-tight connection between the lid 52 and the separator tank 50. Various mechanical means such as threaded fasteners (not shown) or the like can be utilized to secure the lid 52 to the separator tank 50. A blow down conduit 80 can extend from the separator tank 50 to the blow down valve 90. The blow down valve 90 is operable for reducing pressure in the separator tank 50 when the compressor 30 is unloaded and not supplying compressed air to an end load. An air supply conduit 82 can be operably coupled to the separator tank 50 so as to deliver compressed air to a separate holding tank (not shown) or to an end load for industrial uses as would be known to those skilled in the art. An oil supply conduit 70 can extend from the separator tank 50 to the compressor 30 to supply oil that has been separated from the working fluid in the separator tank 50 to the compressor 30. One or more filters 81 can be used in certain embodiments to filter particles from the oil and/or separate contaminates such as water or the like from working fluids in the compressor system 10.

Figure 2:
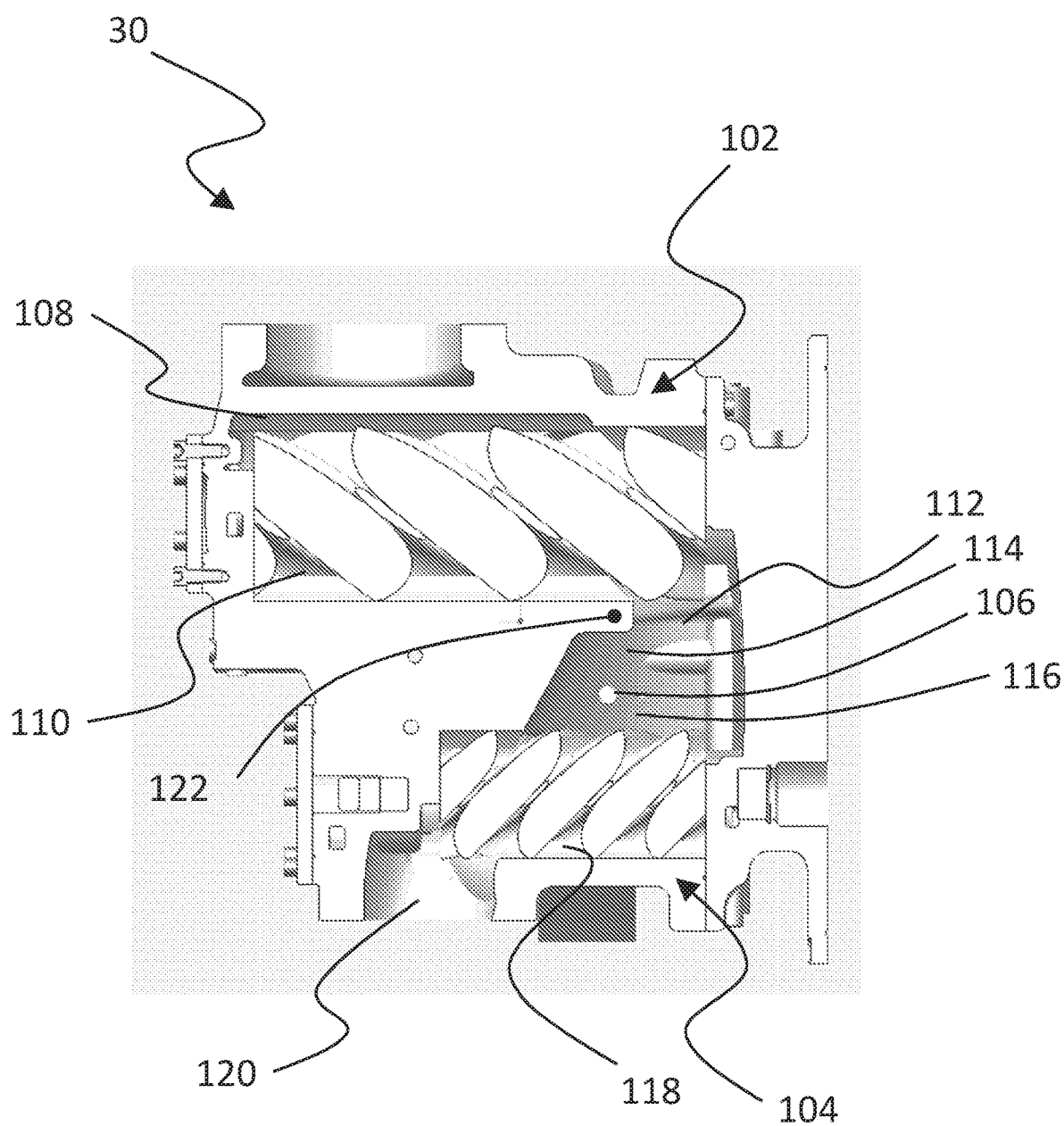
FIG. 2 depicts a view of a compressor having an oil rod.
Figure 3:
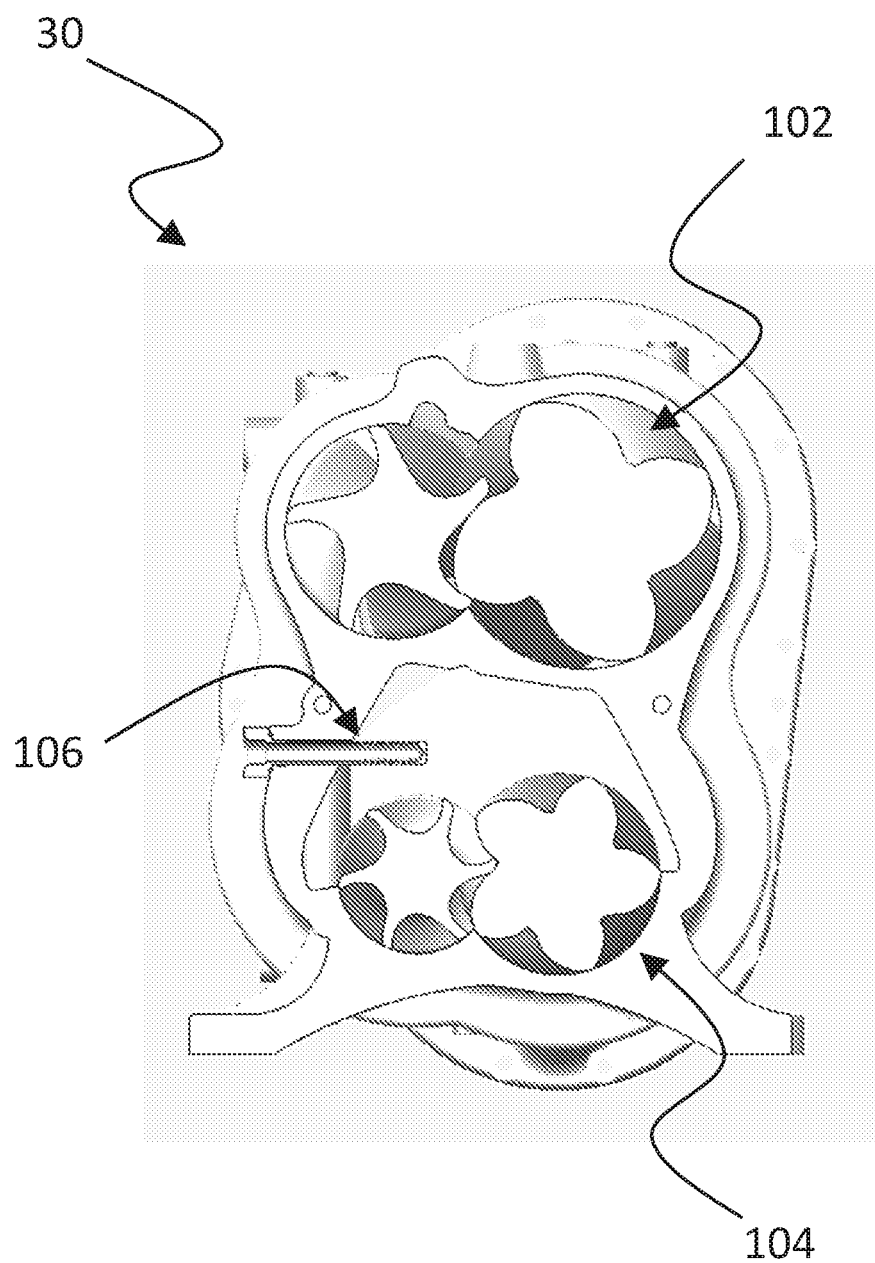
FIG. 3 depicts another view of a compressor having an oil rod.

Turning now to FIGS. 2-3, one embodiment of the compressor 30 is illustrated in the form of a multi-stage screw compressor including a first stage 102 and second stage 104. The two stage oil flooded rotary screw compressor 30 depicted in FIGS. 2-3 compress a working fluid such as air in a two-step process in which the first stage 102 compresses the working fluid to an intermediate pressure followed directly by the second stage 104 that compresses the working to the final desired operating pressure. The compression process uses lubricant/coolant such as oil in the compression chambers of the two stages to lubricate contacting rotor surfaces, seal clearance regions, and remove heat from the working fluid as it is compressed. Common methods of such lubrication/cooling include injection of oil in the first stage as well as injection of oil as a solid fluid stream from one or many orifices.

The present application introduces lubricant/coolant in an interstage region between the first and second stages 102 and 104 through the use of a rod 106 (referred to herein as an "oil rod" for sake of convenience, without any limitation intended as to the type of lubricant used) which is inserted upstream of the second stage 104 rotors. Lubricant can also be introduced elsewhere in the compressor 30, including during the first stage 102 compression process. In one form the oil is introduced in the interstage region via an injector such as the oil rod 106 that is specifically designed to produce an atomized oil spray.

As shown in FIG. 2, working fluid enters the first stage inlet 108, travels through the first stage compression chamber 110 and exits via the first stage discharge 112 into the interstage 114 which is the region in which the first stage discharge 112 merges with the second stage inlet 116. From here the air travels through the second stage compression chamber 118, and out the second stage discharge 120. In some embodiments, oil can be injected into the first stage compression chamber 110 via internal bores that feed oil to a location between the ends of the rotor pair. Though the rotors are depicted as residing in a common housing, in some embodiments the rotors can be separated. In one nonlimiting example the rotors can be connected via a conduit, pipe, or other suitable device. Such passages will therefore be understood to include any suitable throughway such as, but not limited to, a passage internal to a common housing, a passage within a conduit or pipe, etc.

The oil rod 106 can be positioned and/or oriented in any number of manners suitable for the injection of coolant/lubricant. For example, the oil rod 106 is shown in the interstage region 114 located beneath a shelf 122 in FIG. 2, but any other location suitable for the injection of coolant/lubricant is also contemplated herein. To set forth just a few non-limiting examples, the oil rod 106 can be located closer to the first stage discharge 112 than depicted, and alternatively and/or additionally be shifted axially relative to its illustrated position. FIG. 3 depicts the oil rod 106 being installed in a roughly parallel position to that of a plane in which the axes of rotation of the male and female rotor reside of the second stage 104. Such orientation can alternatively and/or additionally be roughly parallel to the plane in which the axes of rotation of the male/female rotor reside of the first stage 106. In other embodiments the oil rod 106 can be oriented in the space between the first stage rotors and the second stage rotors in an orientation that extends toward either of the first stage 102 and second stage 104. Alternatively and/or additionally, the oil rod 106 can be oriented such that it extends toward either of the axial ends of either the first stage 102 or the second stage 104. It is noted that the application does not limit the relative location, position, orientation, etc of the rod to the male or female rotor. In FIG. 3 the rod 106 is depicted above the female rotor but it could just as equally be placed over the center of the rotors or over the male rotor. The oil rod 106 can also be parallel to the rotor axis of rotation. It will therefore be appreciated that any combination of the above is also contemplated herein. In short, the oil rod 106 can be located in any number of positions and be placed in any number of orientations anywhere between the rotors of the first stage 102 and the second stage 104.

The oil rod 106 can be secured in place using any number of techniques. In one embodiment the oil rod can include a threaded surface structured to engage a complementary threaded bore in a structure such as, but not limited to, a housing that enclosed one or more components of the compressor 30. Assembly into the compressor housing is not to be limited by the design discussed and could include, by non-limiting example, a variety of thread connection types, clamping or retaining features from additional components, press fit, etc. Other approaches are therefore contemplated herein.

Figure 4:
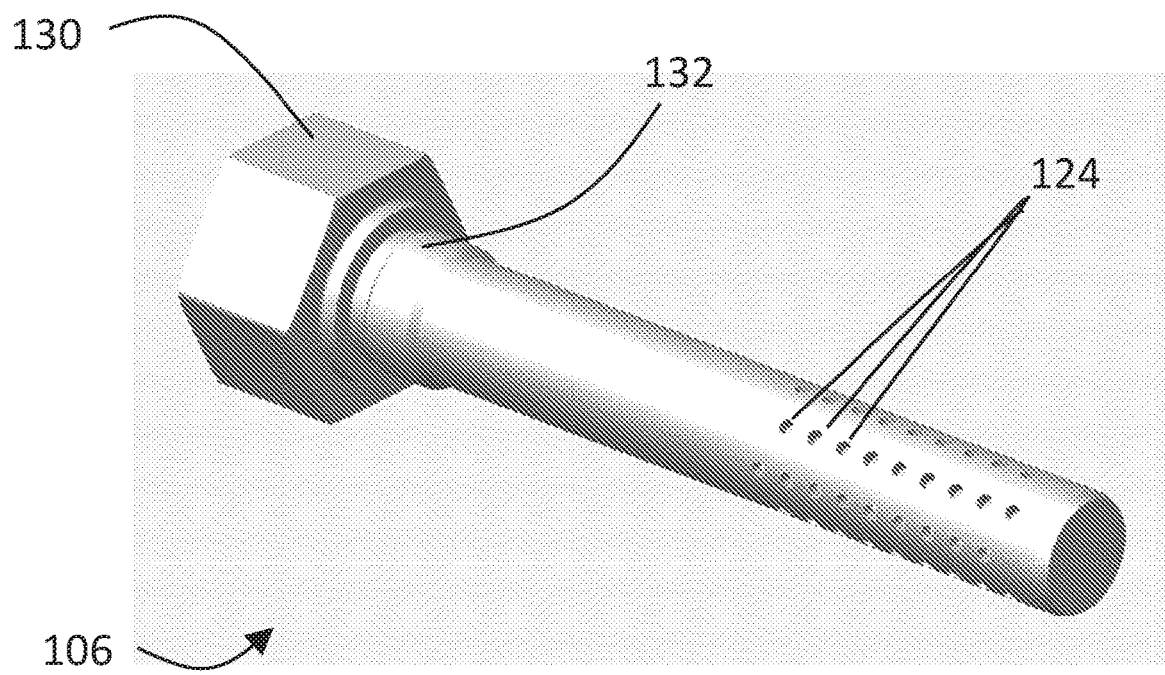
FIGS. 4-9 depict embodiments of an oil rod.
Figure 5:
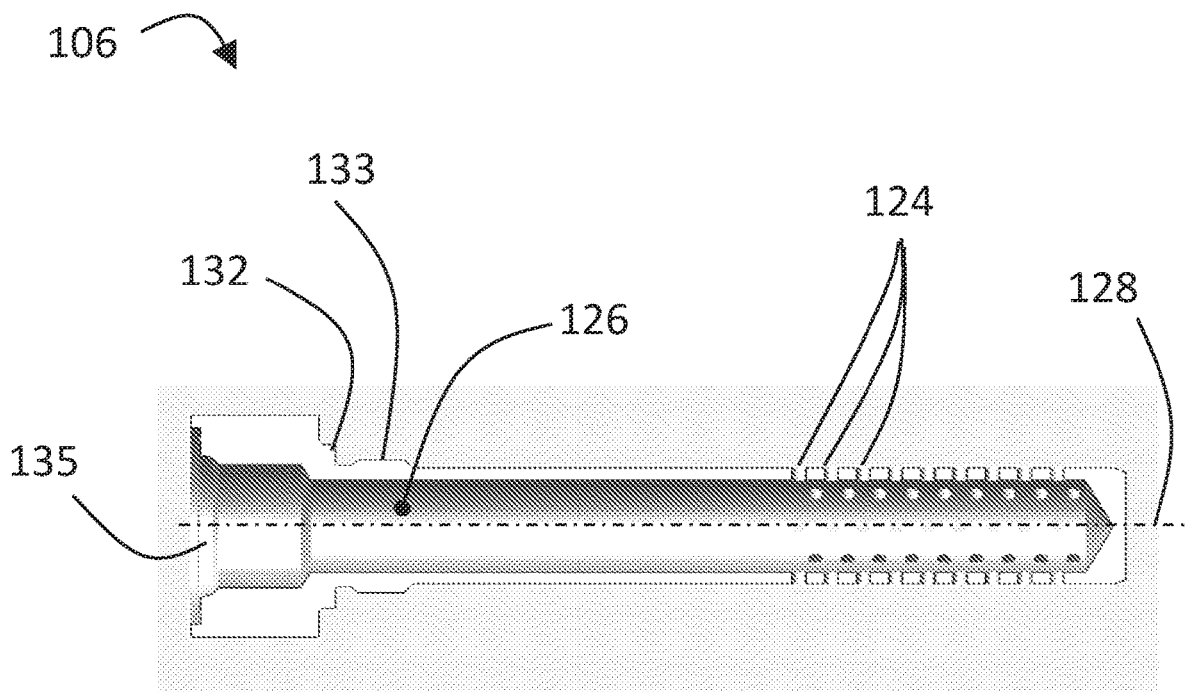

Turning now to FIGS. 4-10, the oil rod 106 can take on a number of forms suitable for injecting lubricant into the compressor 30. FIGS. 4 and 5 depict an embodiment which includes several orifices or openings 124 formed near an end of the oil rod 106 which permit oil flowing within an internal passage 126 of the oil rod to exit and be discharged into the passing compressed flow stream. The openings 124 can be designed to produce a variety of spray patterns and characteristics, and in one form are designed to atomize and/or mist the oil into the interstage prior to introduction of the compressed working fluid into the second stage 104. In some forms the droplet sizes of the atomized spray can be uniform in size when provided via a spray outlet, or can vary. The spray outlets can vary to produce a varying range of droplet sizes.

The passage 126 can extend in any configuration and to any length of the oil rod 106. In the illustrated embodiment the passage 126 is depicted as a central bore, but other embodiments can include different configurations such as different path shapes (e.g. non-linear), greater number of passages (e.g. two or more, branching, converging), etc.

The openings 124 can take on any variety of shapes, configurations, geometry, quantity, orientations, etc. In the embodiments contemplated herein, the distribution of openings 124 in the oil rod 106 can produce an even oil spray that coats the entire or substantially entire exposed rotor surface area of the rotors in the second stage 104. As illustrated in FIGS. 4-5, the openings 124 can be grouped toward an end of the oil rod 106 and can generally be oriented in the same direction orthogonal to an axis 128. The axis can generally represent a direction along which the oil rod 106 extends, though in some forms the oil rod 106 may not extend symmetrically along the axis. In some forms the axis of extension can be a singular axis around which the oil rod 106 symmetrically extends. In other forms the axis of extension of the rod 106 can be a general direction along which the oil rod can extend, whether such extension is along a straight line.

The openings 124 in FIG. 5 are generally oriented orthogonal to the axis 128, but other directions are also contemplated in other embodiments (some of which are described further below). The openings 124 can extend in rows along the length of the oil rod 106 as seen in FIG. 4, but other patterns are also contemplated. In addition, some rows can include fewer or greater numbers of openings 124 than other rows. In some forms the oil rod 106 can include one or more openings 124 formed in the end of the rod 106, which although illustrated as a flat surface can also take on different forms in other embodiments. The openings 124, furthermore, can include a cross sectional area that remains constant between the internal passage 126 and the external surface of the rod in any of the embodiments herein, but variations in cross-sectional area are also contemplated. For example, the side wall(s) that form the opening 124 can be parallel in some forms, but can also be tapered (e.g. conical in shape).

The oil rod 106 can include a head 130 which can be structured to aid in the insertion of the rod 106 into the compressor 30. Such a head can be hex in shape such as might be engaged by a socket or wrench, but other shapes are also contemplated. The oil rod 106 can include a shoulder 132 useful to form a seal and/or cooperate with other structure to form a seal such as to discourage pressurized working fluid from escaping the compressor 30. An o-ring can be disposed between the shoulder 132 and feature 133, which in some embodiments can be a threaded feature. The head 130 can also include provisions to permit coupling with a lubricant supply line such as via feature 135. Such coupling can be via quick disconnect, but other techniques of attaching a lubricant line to the head 130 are also contemplated herein.

Figure 6:
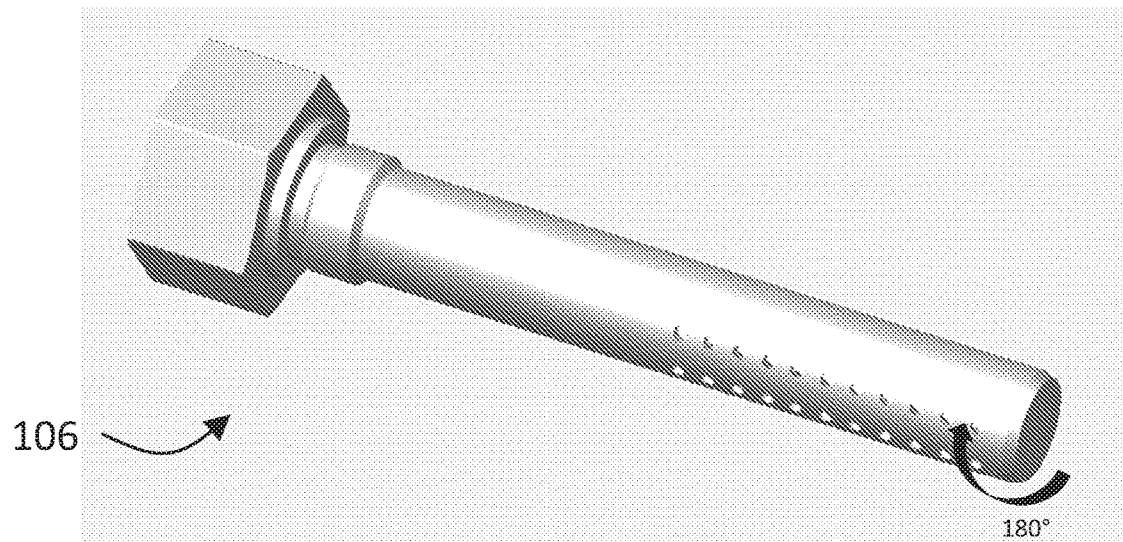
Figure 7:
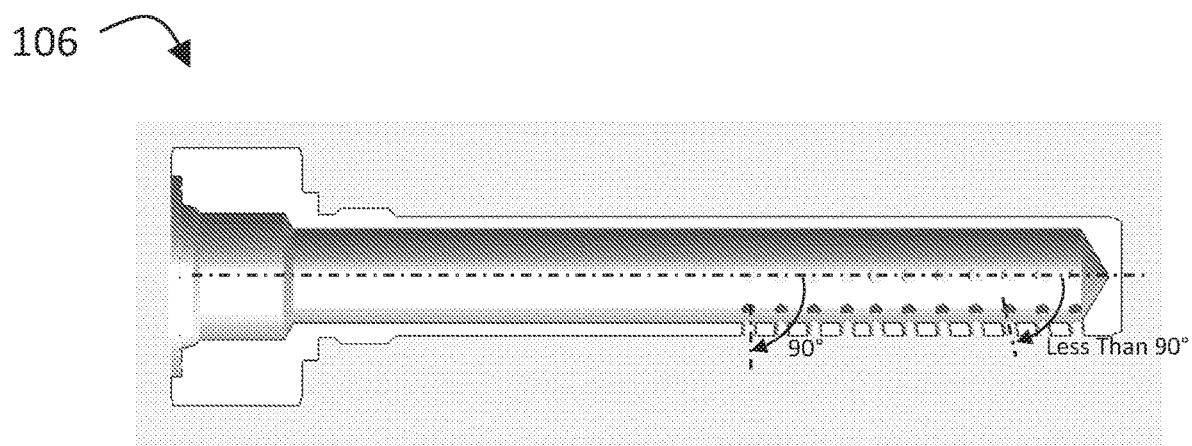
Figure 8:
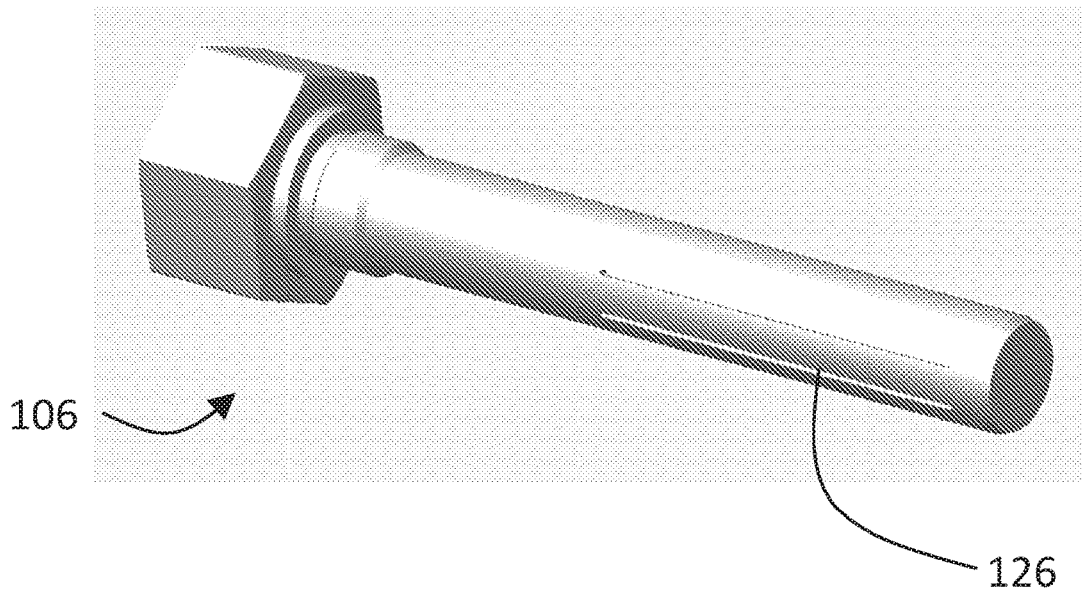

Turning now to FIGS. 6 and 7, another embodiment of the oil rod 106 is depicted which includes a combination of non-uniform orifice holes with varying orientations relative the longitudinal axis of the oil rod 106 which act to direct and distribute the injected oil to specific areas. Some embodiments can include either the non-uniformity or the varying orientations, or both. As seen in FIGS. 6 and 7, the openings 124 are confined around only 180° of the oil rod body. In some forms the openings 124 can be grouped together to span less than 180°, while in other forms the openings 124 can span greater than 180° but less than 360°. The openings 124 can also be concentrated in two or more subgroups. The openings 124 located nearest the end of the rod 106 illustrated in FIG. 7 are oriented in a non-orthogonal direction to the axis 128 of the oil rod 106. It is therefore contemplated that the openings 124 having similar orientations can be grouped in proximity to one another, and the groupings that result can provide a distribution of two or more orientations along the length of the oil rod 106. Such embodiments can alternatively and/or additionally be distributed around the entirety of the periphery of the oil rod 124 as shown in FIGS. 4 and 5, or can be confined to one side or groupings as shown/discussed in FIGS. 6 and 7 above. Additionally, embodiments can include one or more opening in the end of the oil rod 106 as discussed above.

Figure 9:
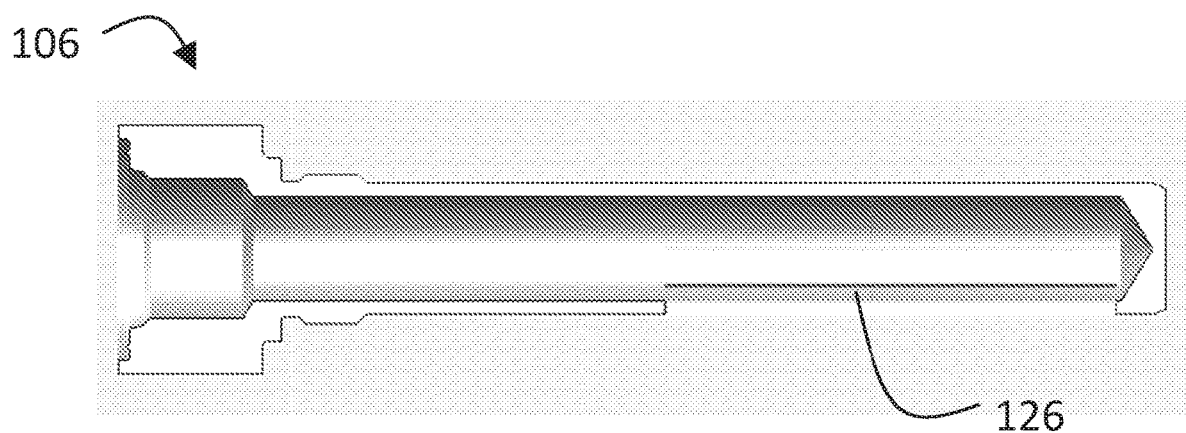
Figure 10:
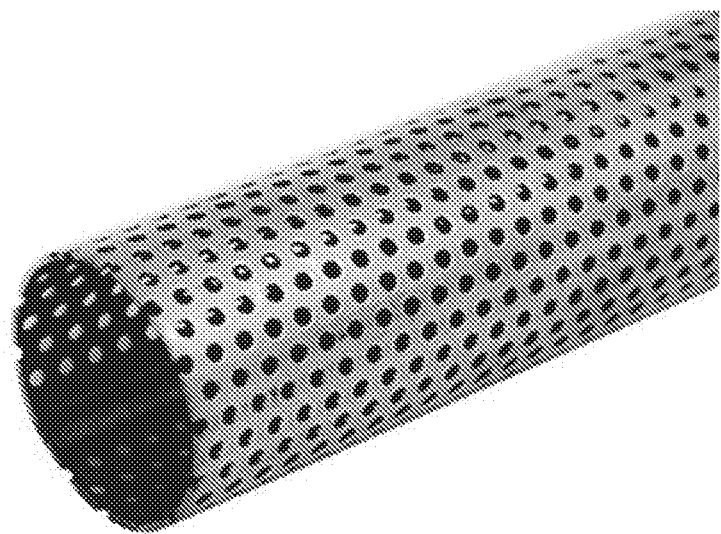
FIG. 10 depicts an embodiment of an oil rod.

Still yet another embodiment is depicted in FIGS. 9 and 10 in which the openings 126 are depicted as slots. The slots can run parallel to the longitudinal axis of the oil rod 106. The openings 126 in FIGS. 8 and 9 can include any of the variations discussed above for the other embodiments including size, groupings, locations, orientation, shapes, configurations, geometry, quantity, cross sectional shape, etc. The openings 126 depicted in FIGS. 8 and 9 can produce a variety of spray patterns as discussed above with regard to the other embodiments.

The embodiments of the oil rod 106 disclosed herein can be made using any variety of techniques. For example, the oil rod 106 can be a single piece that is machined on a lathe or screw type machine from round or hex bar stock. In other forms the oil rod can be made from multiple pieces that are either welded or joined together via other techniques, some forms of which could include the use of perforated tube. FIG. 10 depicts one form of a perforated tube. Such a perforated tube can be made from a perforated sheet that is rolled and affixed to itself.

In some forms the system 10 can supply oil to the oil rod 106 at a variety of pressures, temperatures, and flow rates. Such pressures/temperatures/flow rates/etc can be regulated to vary depending on an operating condition of the compressor. Alternatively and/or additionally, the oil rod 106 can include variable openings where the opening size and/or direction can be changed. These openings can be varied during operation of the compressor and/or during an installation process which permits setting a value for such possible variations.

One aspect of the present application includes an apparatus comprising a multi-stage contact cooled compressor having a first stage rotary compressor located upstream from a second stage rotary compressor, the multi-stage contact cooled compressor also including: a transfer volume located intermediate the first stage rotary compressor and second stage rotary compressor which is used to receive outflow from the first stage rotary compressor and convey the outflow to the second stage rotary compressor, and an oil feed rod oriented to protrude into the transfer volume between the first stage rotary compressor and second stage rotary compressor such that an exterior periphery of the oil feed rod is exposed to the outflow from the first stage rotary compressor, the oil feed rod having an open interior for the receipt of oil as well as a plurality of openings formed in the exterior periphery of the oil feed rod through which oil from the open interior of the oil feed rod can pass into the transfer volume.

A feature of the present application includes wherein the oil feed rod extends from a wall that defines the transfer volume and terminates at an end, the exterior periphery of the oil feed rod defined between the wall and the end.

Another feature of the present application includes wherein the oil feed rod includes a circular cross sectional shape, and wherein each of the plurality of openings are symmetric.

Yet another feature of the present application includes wherein the oil feed rod is in the form of a hollow tube, and wherein the plurality of openings are sized to produce a spray of oil droplets.

Still another feature of the present application includes wherein the oil feed rod protrudes along a centerline axis into the transfer volume, and wherein the plurality of openings each extend along an axis oriented at angle to the centerline axis.

Yet still another feature of the present application includes wherein the oil feed rod includes at least one opening at the end of the tube.

Still yet another feature of the present application includes wherein the openings of the oil feed rod include a plurality of elongated slots that extend along an elongate axis.

A further feature of the present application includes wherein the oil feed rod includes an asymmetric distribution of the plurality of openings such that the plurality of openings are isolated on a portion of the exterior periphery.

Another aspect of the present application includes an apparatus comprising: a first contact cooled compressor stage that includes a first pair of compressor rotors, a second contact cooled compressor stage having a second pair of compressor rotors, a passage that connects an outlet of the first contact cooled compressor stage to an inlet of the second contact cooled compressor stage, and an oil delivery rod having an external oil delivery surface positioned to extend into the internal passage and structured to provide oil to a passing flow of working fluid produced by the first contact cooled compressor stage, the external oil delivery surface including a plurality of openings positioned between a first exposed end of the oil delivery rod and a second exposed end of the oil delivery rod.

A feature of the present application includes wherein the plurality of openings extend between an inner surface of the oil delivery rod and the external oil delivery surface.

Another feature of the present application includes wherein the plurality of openings have sidewalls between the inner surface and the external oil delivery surface, the openings extending at an angle relative to an axis of extension of the oil delivery rod such that the angle is non-orthogonal.

Yet another feature of the present application includes wherein the plurality of openings are elongate slotted openings.

Still another feature of the present application includes wherein the plurality of openings are sized to atomize oil that is conveyed through the openings.

Yet still another feature of the present application includes wherein a spray pattern formed by the plurality of openings extends around the entirety of the periphery of the oil delivery rod.

Still yet another feature of the present application includes wherein the plurality of openings includes an opening formed at an end of the oil delivery rod, and wherein at least some of the plurality of openings are variable.

A further feature of the present application includes wherein the oil delivery rod includes a threaded surface structured to be threadingly engaged with a complementary threaded surface structured to secure the oil delivery rod relative to the internal passage.

Yet another aspect of the present application includes a method comprising: compressing a working fluid with a multi-stage contact cooled compressor, routing the compressed working fluid from a first stage to a second stage of the multi-stage contact cooled compressor, and spraying oil out of an elongated oil rod in an interstage region between the first stage and the second stage, the elongated oil rod having a plurality of openings arranged along a length of the elongated oil rod such that oil is provided to the compressed working fluid from the first stage prior to being entrained in a compression process of the second stage.

A feature of the present application includes wherein the spraying includes atomizing the oil.

Another feature of the present application includes wherein spraying includes conveying the oil through the plurality of openings having a slot shape.

Still another feature of the present application includes wherein the spraying includes isolating the spraying to one side of the oil rod such that an oil spray pattern is not omni-directional.

Yet still another feature of the present application further includes spraying oil through an opening formed in an end of the elongated oil rod such that a spray pattern provided by the opening formed in the end of the elongated oil rod extends in a direction along a length of the elongated oil rod.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A multi-stage contact cooled compressor having a first stage rotary compressor located upstream from a second stage rotary compressor, the multi-stage contact cooled compressor comprising:
    a transfer volume located intermediate to the first stage rotary compressor and the second stage rotary compressor, wherein the transfer volume is used to receive outflow from the first stage rotary compressor and convey the outflow to the second stage rotary compressor; and
    an oil feed rod having an exterior periphery that extends in a longitudinal direction, the oil feed rod oriented to protrude into the transfer volume such that the longitudinal direction is orthogonal to a line parallel to an axis of rotation of the first stage rotary compressor, the oil feed rod having an open interior for the receipt of oil as well as a plurality of openings formed in the exterior periphery of the oil feed rod through which oil from the open interior of the oil feed rod can pass into the transfer volume.

2. The apparatus of claim 1, wherein the oil feed rod extends from a wall that defines the transfer volume and terminates at an end, the exterior periphery of the oil feed rod defined between the wall and the end.

3. The apparatus of claim 2, wherein the oil feed rod includes a circular cross-sectional shape, and wherein each of the plurality of openings are symmetric.

4. The apparatus of claim 2, wherein the oil feed rod is in the form of a hollow tube, and wherein the plurality of openings are sized to produce a spray of oil droplets.

5. The apparatus of claim 4, wherein the oil feed rod further comprises a second plurality of openings formed in the exterior periphery of the oil feed rod, the second plurality of openings configured to discharge the oil in a non-orthogonal direction relative to the longitudinal direction.

6. The apparatus of claim 4, wherein the oil feed rod includes at least one opening at the end of the tube.

7. The apparatus of claim 2, wherein the oil feed rod includes an asymmetric distribution of the plurality of openings such that the plurality of openings are isolated on a portion of the exterior periphery.

8. The apparatus of claim 1, wherein the openings of the oil feed rod include a plurality of elongated slots that extend parallel to the longitudinal direction.

9. An apparatus comprising:
    a first contact cooled compressor stage that includes a first pair of compressor rotors;
    a second contact cooled compressor stage having a second pair of compressor rotors;
    a passage that connects an outlet of the first contact cooled compressor stage to an inlet of the second contact cooled compressor stage; and
    an oil delivery rod having an external oil delivery surface that extends in a longitudinal direction, the oil delivery rod positioned to extend into the passage such that the longitudinal direction is orthogonal to a line parallel to an axis of rotation of the first pair of compressor rotors, the external oil delivery surface including a plurality of openings positioned between a first exposed end of the oil delivery rod and a second exposed end of the oil delivery rod, the plurality of openings configured to spray oil into a passing flow of working fluid produced by the first contact cooled compressor stage.

10. The apparatus of claim 9, wherein the plurality of openings extend between an inner surface of the oil delivery rod and the external oil delivery surface.

11. The apparatus of claim 10, wherein the plurality of openings are elongated slotted openings.

12. The apparatus of claim 10, wherein the plurality of openings are sized to atomize oil that is conveyed through the openings.

13. The apparatus of claim 12, wherein a spray pattern formed by the plurality of openings extends around the entirety of the periphery of the oil delivery rod.

14. The apparatus of claim 12, wherein the plurality of openings includes an opening formed at an end of the oil delivery rod.

15. The apparatus of claim 12, wherein the oil feed rod further comprises a second plurality of openings formed in the exterior periphery of the oil feed rod, the second plurality of openings configured to discharge the oil in a non-orthogonal direction relative to the longitudinal axis.

16. A method comprising:
compressing a working fluid with a multi-stage contact cooled compressor;
routing the compressed working fluid from a first stage to a second stage of the multi-stage contact cooled compressor; and
spraying oil out of an elongated oil rod in an interstage region between the first stage and the second stage, the elongated oil rod elongated in a longitudinal direction that is orthogonal to a line parallel to an axis of rotation of the first stage of the multi-stage contact cooled compressor, the elongated oil rod having a plurality of openings formed in the elongated oil rod and arranged along the longitudinal direction such that oil is provided to the compressed working fluid from the first stage prior to being entrained in a compression process of the second stage.

17. The method of claim 16, wherein the spraying includes atomizing the oil.

18. The method of claim 16, wherein spraying includes conveying the oil through the plurality of openings having a slot shape.

19. The method of claim 16, wherein the spraying includes isolating the spraying to one side of the oil rod such that an oil spray pattern is not omnidirectional.

20. The method of claim 16, which further includes spraying oil through an opening formed in an end of the elongated oil rod such that a spray pattern provided by the opening formed in the end of the elongated oil rod extends in a direction along a length of the elongated oil rod.

* * * * *